United States Patent [19]

Steinke

[11] 3,796,354

[45] Mar. 12, 1974

[54] SELF-UNLOADING BOX WITH TRANSVERSE DISCHARGE OPENING INCLUDING A CONTINUOUS SPIRAL AUGER WITH CUTTING MEANS

[76] Inventor: Charles W. Steinke, 413 North Park, Fairfax, Minn. 55332

[22] Filed: Oct. 4, 1971

[21] Appl. No.: 186,064

Related U.S. Application Data

[62] Division of Ser. No. 829,431, June 2, 1969, Pat. No. 3,612,410.

[52] U.S. Cl................................ 222/178, 239/675
[51] Int. Cl............................................. A01c 15/00
[58] Field of Search .......... 222/176, 177, 178, 532, 222/236, 333; 239/672, 669, 676, 675

[56] References Cited
UNITED STATES PATENTS

| 3,260,382 | 7/1966 | Klover | 222/236 X |
| 3,063,723 | 11/1962 | Toft | 239/672 X |
| 3,176,884 | 4/1965 | Klouda | 222/542 X |
| 3,123,363 | 3/1964 | Hedtke | 239/676 |

Primary Examiner—Stanley H. Tollberg
Assistant Examiner—James M. Slattery

[57] ABSTRACT

A truck having front drive wheels and dual tandem rear drive wheels carrying a self-unloading box having a rotating spreader for selectively discharging material rearwardly and to either side of the box. The box is mounted on the truck frame so that a major portion of the box is located forwardly of the transverse load line between the rear dual tandem drive wheels. A rotatable transverse auger having outwardly directed knives discharges material from the box. A gate located rearwardly of the auger is used to close the material discharge opening.

13 Claims, 4 Drawing Figures

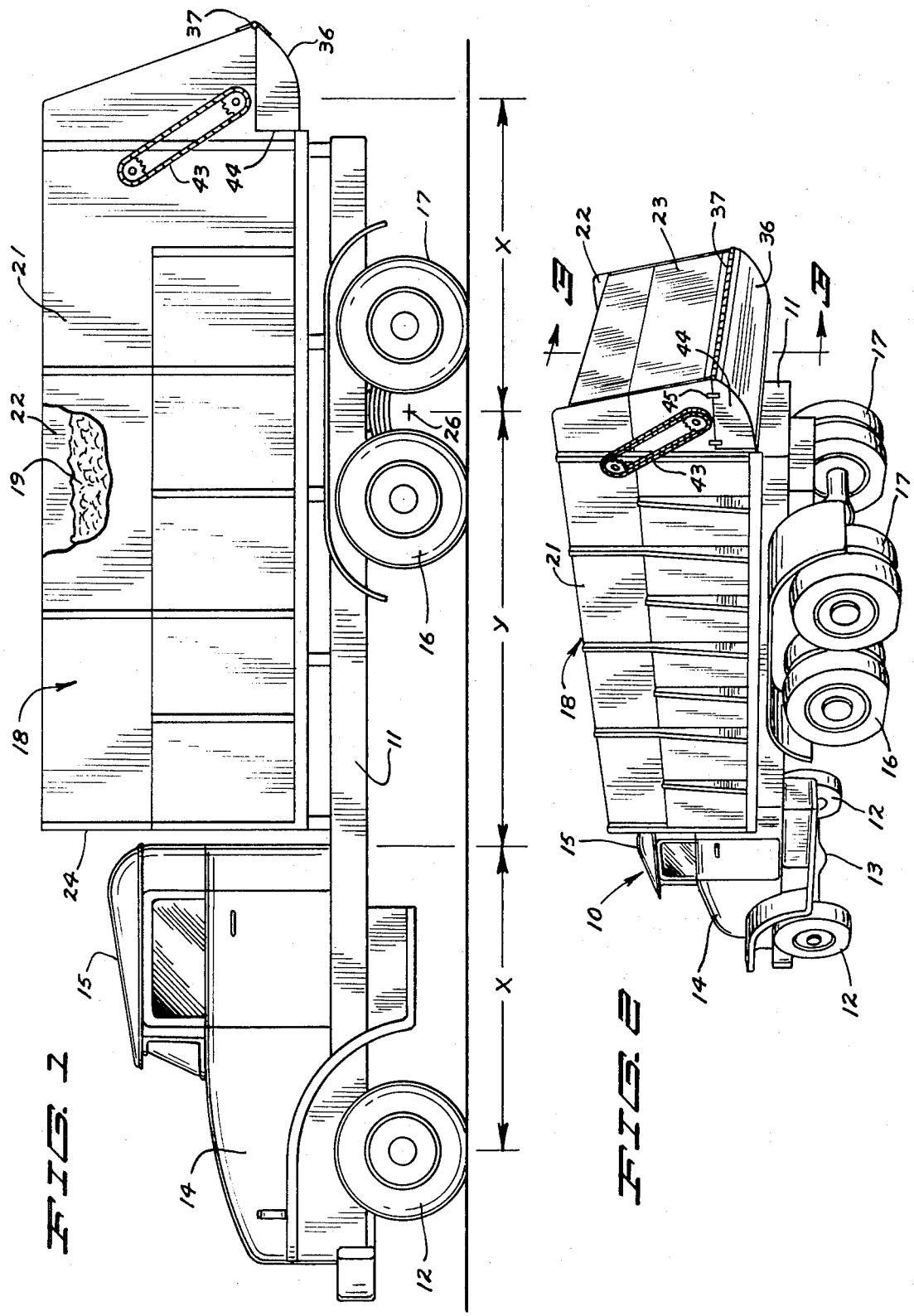

SELF-UNLOADING BOX WITH TRANSVERSE DISCHARGE OPENING INCLUDING A CONTINUOUS SPIRAL AUGER WITH CUTTING MEANS

CROSS-REFERENCE TO RELATED APPLICATION

This application is a division of U. S. Pat. application Ser. No. 829,431, now U. S. Pat. No. 3,612,410.

BACKGROUND OF INVENTION

Self-unloading spreading units have been used with motor vehicles to spread material, as silage, haylage, straw, and like particulate materials in feed lots, and in open fields. In the harvesting of silage and pea-vines, it is common practice to haul the material near the feed lot and store the material in a storage area, as a large open pit or stack. Self-unloading wagons are used to dump the material onto the storage area. As the size of and height of the stored material increases, it is difficult to unload the wagons. Separate elevators or conveying structures are used to continue to build the storage pile.

SUMMARY OF INVENTION

The invention broadly relates to a motor vehicle carrying a self-unloading unit which can be used on relatively soft ground or material, as silage, pea-vines and like materials. The vehicle is a six-wheel drive machine having a long generally horizontal frame. Front single or dual drive wheels are operatively mounted on the front portion of the frame and tandem dual drive wheels are mounted on the rear portion of the frame. Secured to the frame over the dual rear drive wheels is a box or container for carrying particulate material. The major portion of the box is located forwardly of the transverse load line of the rear drive wheels. When the box is loaded, the weight distribution on all of the drive wheels is substantially even so that each drive wheel will operate in an efficient and effective manner to propel the vehicle over the soft supporting surface. Located in the box is a horizontal conveyor operative to move the material in the box toward rotating spreading means carried on the rear section of the box. The rotating spreading means includes an auger operative to pick up the material adjacent the horizontal conveyor and move the material rearwardly spreading the material on the supporting surface. Located below the auger is a gate which can be closed so that the auger can operate to move the material in a transverse direction through an opening in the side of the box. The drive to the distributing auger may be reversed so that the material is discharged through the opposite side of the box.

IN THE DRAWINGS

FIG. 1 is a side view of the six-wheel drive truck and self-unloading box of the invention showing the longitudinal relationship between the box and truck frame;

FIG. 2 is a perspective view of the truck and box of FIG. 1;

Figure 3:
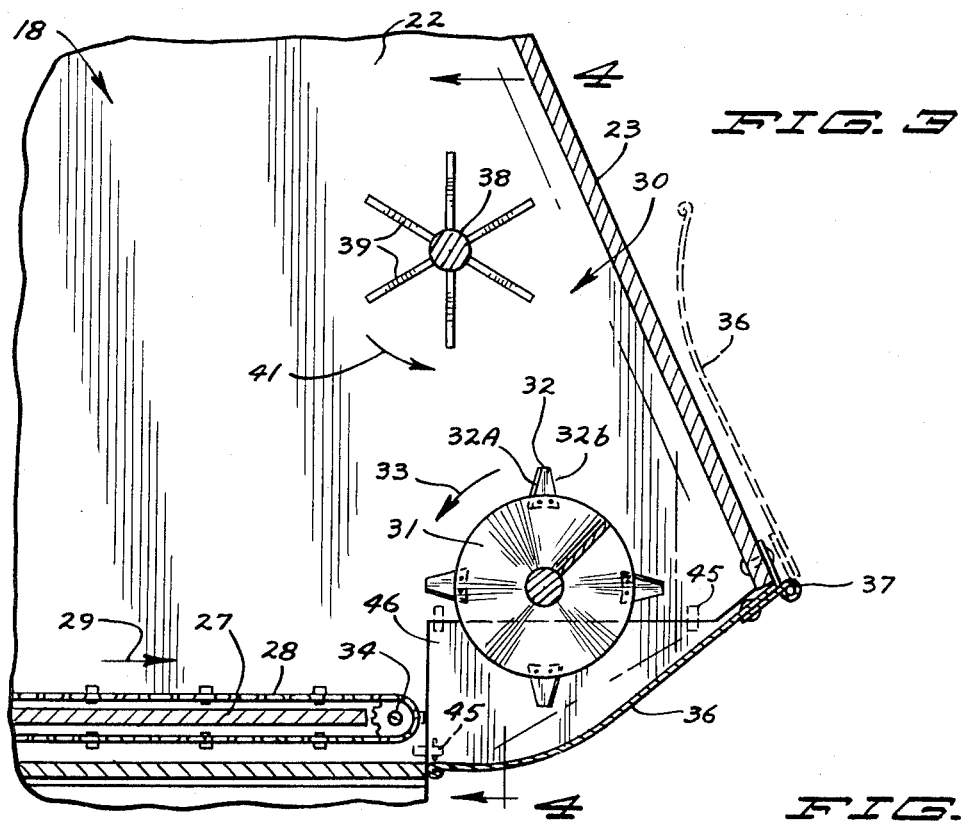
FIG. 3 is an enlarged sectional view taken along the line 3—3 of FIG. 2 showing the auger spreader mechanism mounted on the rear of the box.

Referring to the drawings, there is shown in FIG. 2, a six-wheel drive motor vehicle, indicated generally at 10, having longitudinal frame 11 carrying a pair of front steering drive wheels 12 drivably coupled to a differential 13. Wheels 12 can be single or dual wheel assemblies. A conventional internal combustion engine under hood 14 is connected to a suitable speed reducing transmission to transmit power to the differential 13 to provide the vehicle 10 with front wheel drive. A driver's cab 15 is located behind hood 14.

Mounted on the rear portion of the frame 11 are dual tandem drive wheels 16 and 17 which are connected to the engine with suitable differentials. The vehicle 10 is known as a six-wheel or 6 × 6 drive truck. The transmission may have 3-speed dual range hydraulic controls providing the vehicle with five forward speeds in each range.

Secured to the frame 11 is a self-unloading container or box, indicated generally at 18, for carrying particulate material, as silage, pea-vines, haylage, and like forage materials. The box has parallel upright side walls 21 and 22 joined to a transverse rear wall 23 and an upright front wall 24. The front wall 24 is adjacent the rear of cab 15.

As shown in FIG. 1, the distance Y from adjacent the rear of the cab 15 or the front of the box to the center of the tandem drive wheels or the transverse load line 26, between the rear dual tandem drive wheels, is greater than the distance X from the transverse load line 26 to the rear of the box. The distance X from adjacent the rear of the cab 15 or front of the box to the axle of the front drive wheels is approximately equal to the distance between transverse load line 26 and the rear of the vehicle. The distance X is approximately two-thirds of the distance Y. The distances X plus Y is equal to the load carrying length of the box 18. As an example, the distance X can be 7 feet and the distance Y 9-½ feet. This ratio of the location of the box relative to the frame 11 places a major portion of the box forwardly of the transverse load line 26 so that when the box is full of particulate material, there is substantially equal load on all of the six drive wheels of the vehicle. As the material unloads from the vehicle, there is a minimum of variation on the drive wheels, as the material is removed from the mid-portion of the vehicle. The loads on the opposite ends of the vehicle are relatively equal whereby all of the drive wheels can perform in an effective and efficient manner.

Referring to FIG. 3, the box 18 has a relatively flat floor or bed 27 carrying a horizontal conveyor 28 operable to move in a rearward direction, as indicated by arrow 29, to move the material 19 in the box toward a spreader mechanism, indicated generally at 30.

Figure 4:
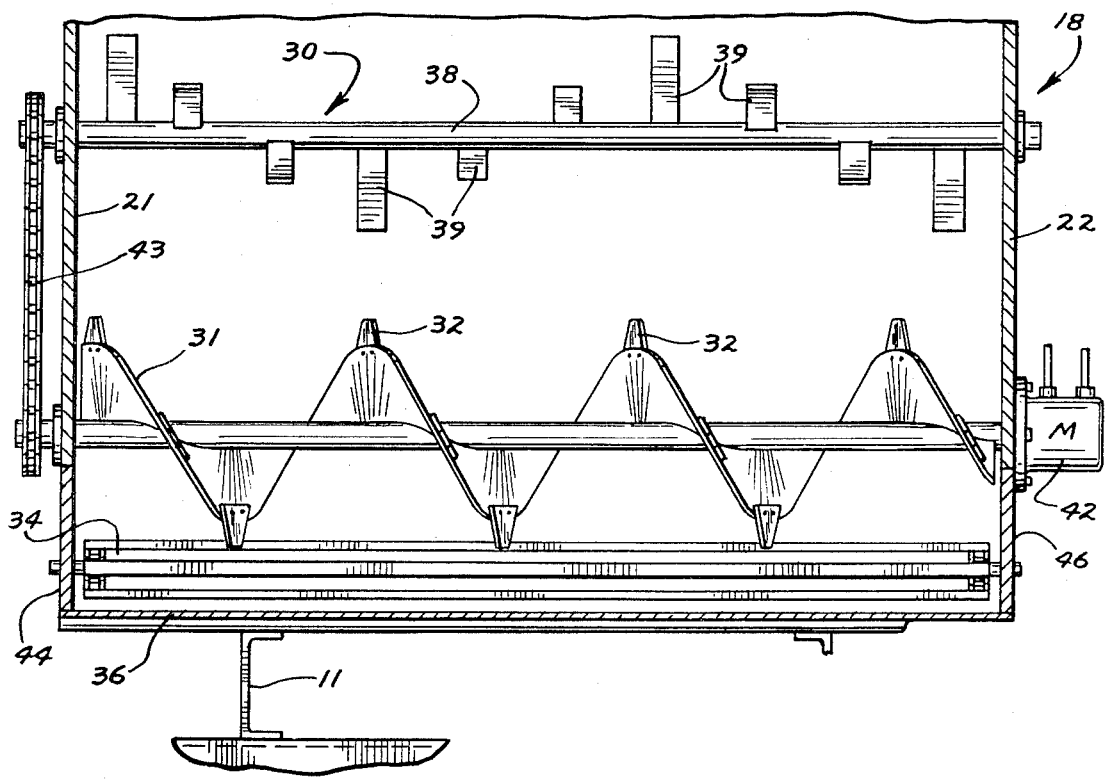
FIG. 4 is a sectional view taken along the line 4—4 of FIG. 3.

As shown in FIG. 4, spreader mechanism 30 extends transversely across the rear of the box 18, and is operable to selectively discharge material rearwardly or to opposite sides of the box. Spreader mechanism 30 comprises a transverse spreader auger 31 rotatably mounted on the side walls 21 and 22 with suitable bearings. The spaced outer portions of auger 31 carry a plurality of cutting knives 32. Each knife is a flat blade having upwardly and inwardly inclined cutting edges 32a and 32b which extend beyond the periphery of the auger. The auger 31 is connected to a motor 42 or a power transmitting transmission operable to rotate the auger in the direction of the arrow 33. The outer ends of the knives 32 move past the end 34 of the conveyor 28 in a contiguous relationship to break up and move the particulate material out of the box. In use, the knives have a combined cutting and plowing action as the blades are positioned at an angle with respect to the longitudinal axis of the box.

Pivotally mounted below and rearwardly of the auger 31 is a gate 36 hinged to the bottom of rear wall 23 on a hinge 37. A lock structure (not shown) is connected to the gate to hold the gate in a closed position as shown in full lines in FIG. 3. The gate retains the material in the box during transport and also functions as a bottom wall or floor when the auger is used to convey material to either side of the box. As shown in full lines, the gate 36 may pivot to an upright position whereby the entire bottom of the rear section of the box is open so that the auger 31 is operable to pick up the material from the conveyor 28 and evenly discharge material rearwardly of the box 18.

Positioned above the auger 31 is a beater 38 having a plurality of axially and circumferentially spaced teeth 39. The beater 38 rotates in the direction of the arrow 41 and is drivably connected with a chain and sprocket drive 43 to the auger 31. The beater 38 operates to break up and feed the top portion of the material down into the auger 31. A separate drive motor or transmission can be used to rotate the beater.

The side walls 21 and 22, adjacent the ends of the auger 31, are provided with removable side doors 44 and 46 respectively which can be opened so that the auger can feed material laterally of the box. Hinges, releasable members, slides and like holding structures 45 are used to retain the door 44 and 46 on the side walls. The doors may be used as lateral chutes to direct the material away from the sides of the box. The auger 31 is rotated in one direction to feed the material through one side of the box. Rotation of the auger 31 in the opposite direction will feed the material to the opposite side of the box. The motor 42, or equivalent power transmitting mechanism, can be provided with a reversing drive so that the auger 31 can be selectively driven in opposite directions.

Various omissions, changes in form, size and details of the truck and spreader self-unloading box, as illustrated and described in the preferred embodiment of the invention, may be made by those skilled in the art without departing from the invention. The invention is defined in the following claims.

The embodiments of the invention in which an exclusive property or privilege is claimed are defined as follows:

1. In combination: a frame; a box mounted on the frame adapted to carry particulate materials, said box having a floor, side walls extended generally upward from opposite sides of the floor and an end discharge section having a transverse discharge opening adjacent one end of said floor and extended across the floor, said end discharge section having a generally upright transverse wall; transverse spreading means located between the side walls in the discharge section inwardly of the transverse wall above the horizontal plane of the floor and outwardly of said one end of said floor, said spreading means operable to discharge particulate materials longitudinally through said transverse discharge opening; conveyor means located on the floor for moving material in the box toward the spreading means, means for moving the conveyor means relative to the floor, said spreading means comprising auger means including a continuous spiral flight having outer edge portions extended transversely across the discharge section adjacent the transverse discharge opening in transverse contiguous relationship with the discharge portion of the conveyor means; a plurality of outwardly directed cutting means mounted on the outer edge portions of the spiral flight for breaking up the particulate materials moved into the auger means; means for rotatably mounting the auger means on the side walls; and means to rotate the auger means whereby the particulate materials moved by the conveyor means into the auger means are broken up by the outwardly directed cutting means and moved through the transverse discharge opening thereby discharging particulate materials through the discharge opening.

2. The combination of claim 1 wherein: the outwardly directed means comprise knife means secured to said auger means, said knife means having at least one cutting edge extending outwardly from the auger means.

3. The combination of claim 1 including: gate means for closing the transverse discharge opening under and rearward of the auger means, said gate means movable to a position to open said transverse discharge opening whereby rotation of the auger means discharges material from the box.

4. The combination of claim 1 wherein: said discharge section is located at the rear end of the box.

5. The combination of claim 1 including: a transverse end wall secured to the side walls and located rearwardly of the auger means.

6. The combination of claim 5 wherein: the end wall extends in an upward and forward direction.

7. The combination of claim 5 including: gate means for closing the transverse discharge opening under and rearward of the auger means and means pivotally mounting the gate means on said end wall.

8. The combination of claim 1 including: rotatable beater means extended between said side walls above said auger means and means to rotate said beater means.

9. The combination of claim 8 wherein: said beater means has a plurality of axially and circumferentially spaced radial teeth.

10. In combination: a frame; a box mounted on the frame adapted to carry particulate materials, said box having a floor, side walls extended generally upwardly from opposite sides of the floor and an end discharge section having a transverse discharge opening adjacent one end of said floor and extended across the floor; spreader means located between the side walls in the discharge section above the horizontal plane of the floor and outwardly of said one end of said floor, said spreader means operable to discharge materials longitudinally through said transverse discharge opening; conveyor means located on the floor for moving material in the box toward the spreader means, means for moving the conveyor means relative to the floor, said spreader means having rotatable auger means including a continuous spiral flight extended transversely across the discharge section adjacent the transverse discharge opening in transverse contiguous relationship with the discharge portion of the conveyor means; a plurality of outwardly directed cutting means mounted on the outer edge portions of the spiral flight for breaking up the particulate materials moved into the auger means; means rotatably mounting the auger means on the side walls; means to rotate the auger means; transverse end wall means located rearwardly of the auger means and spaced from the end of the floor to provide the transverse discharge opening between the end of the floor and the transverse end wall means; gate means for closing the transverse discharge opening under and rearward of the auger means, said gate means movable to a position adjacent the end wall means to open said transverse discharge opening whereby rotation of the auger means discharges material through said transverse discharge opening.

11. The combination of claim 10 wherein: the plurality of outwardly directed cutting means include knife means having cutting edges extended outwardly from the spiral flight for breaking up the particulate materials moved into the auger means.

12. The combination of claim 11 wherein: the end wall means extends in an upward and forward direction.

13. The combination of claim 10 including: rotatable beater means extended between said side walls above said rotatable auger means and means to rotate said beater means.

* * * * *